United States Patent Office 2,896,720
Patented July 28, 1959

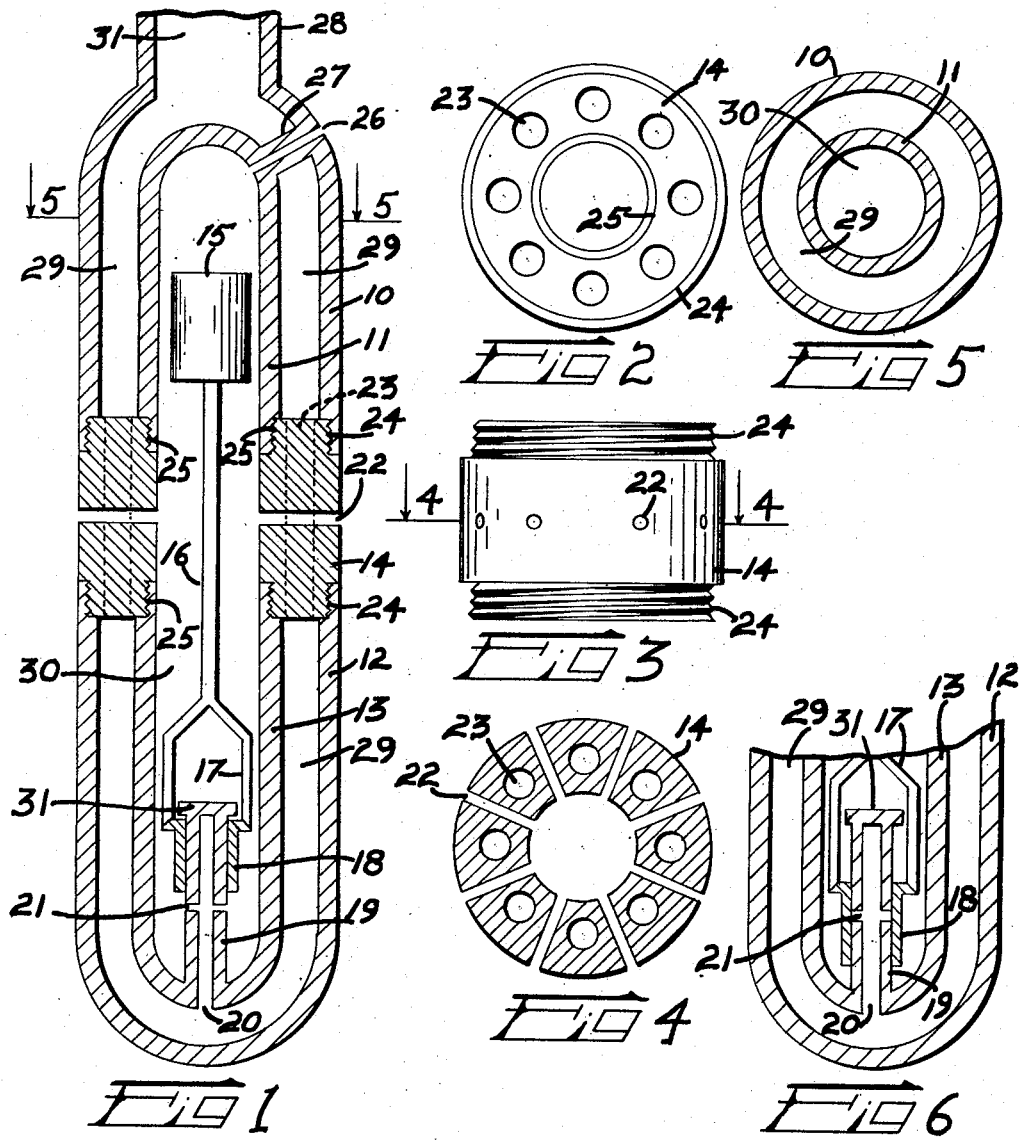

2,896,720

OIL AND GAS SEPARATOR

Herman L. Martin, Andrews, Tex.

Application June 7, 1957, Serial No. 664,392

3 Claims. (Cl. 166—54)

My invention relates to an oil and gas separator of the type that is attached at the bottom of the oil pipe in an oil well and will separate the gas in the well from the oil and permit the latter to be lifted out through the oil pipe.

The objects of my invention are to construct an oil and gas separator that is compact in form, simple and rigid in construction, and contains a float valve which closes and cuts off the flow of oil when the quantity thereof is insufficient to be lifted in the oil pipe. With these and other objects in view my invention resides in the construction and arrangement of parts herein fully described, and particularly pointed out in the claims.

Referring now to the drawings, which are a part of this specification, and in which like characters indicate like parts:

Fig. 1 is a vertical cross section of my oil and gas separator with the float valve in lifted position;

Fig. 2 is a plan view of the coupling member;

Fig. 3 is an elevation of the coupling member;

Fig. 4 is a horizontal section of the coupling member on the line 4—4 of Fig. 3;

Fig. 5 is a horizontal section on the line 5—5 of Fig. 1; and

Fig. 6 is a view similar to Fig. 1 with the float valve 18 in depressed position.

My device comprises two concentric capsules or cylinders the outer having upper half 10 and lower half 12, and the inner having upper half 11 and lower half 13, each of these four halves being joined by means of the coupling 14. This coupling 14 has inner threads 25 into which the halves 11 and 13 are threaded, and outer threads 24 into which the halves 10 and 12 are threaded.

The inner upper half 11 is shown joined integrally to the outer upper half 10 by means of the pipe length 27 through which passes the bore 26 communicating from the inside of the half 11 to the outside of the half 10 and which provides for the escape of gas outward from the inner capsules 11 and 13. It is obvious that the connection may be made by separate parts instead of the integral connection as shown.

The outer upper half capsule 10 has at its top a pipe length 28 having an inner bore 31 which is connected to the oil pipe which is let down from the top of the well.

The coupling 14 has a central portion of the same outer diameter as the capsules 10 and 12 and of the same inner diameter as the capsules 11 and 13, and at its upper and lower ends has an outer thread 24 and an inner thread 25, the outer threads 24 engaging the outer capsules 10 and 12 and the inner threads 25 engaging the inner capsules 11 and 13. Inside and outside of the threads 24 and 25 is a shoulder on which each capsule seats.

Between the outer thread 24 and the inner thread 25 the coupling 14 is provided with a series of vertical holes 23 for the passage of oil upward from the annular space between capsules 12 and 13 to the annular space 29 between capsules 10 and 11 and thence upward through the pipe bore 31.

The annular body of the coupling 14 is drilled with a series of radial holes each two holes spaced an equal number of degrees apart. These holes serve to convey the fluid from its place in the well outside the outer cylinder or capsule into the center of the inner capsule formed by the halves 11 and 13.

I have shown the coupling 14 with a right hand thread at each end, and it can be assembled that way by screwing in the capsule 13 and then the capsule 12 after the capsules 11 and 10 are in place; but it might be found more convenient to assemble if the threads were right and left hand as is well known in pipe fitting.

From the bottom of the lower half 13 rises a vertical pipe length 19 for a short distance and same terminates in a head 31. This pipe has a bore 20 leading upward from the space 29 between the capsules and a short cross bore 21 leading outward from the bore 20 to the central space 30 of the inner capsule composed of the halves 11 and 13. On the outside of pipe length 19 slides a collar 18 closely fitting same and to the collar is attached a bail 17 which is a forked connection of the pitman 16 which is attached to the float 15 which has its position well up in the upper half capsule 11. As shown in Fig. 1 the float 15 is high enough to hold the collar 18 up to keep the cross bore 21 open; but as shown in Fig. 4 the float 15 has descended and the cross bore 21 is closed.

In the assembly of my device the coupling 14 is first screwed home on the capsules 11 and 10. The sleeve 18 is in place on the pipe length 19 and the pitman 16 and float 15 are inserted into the capsule 11 and the capsule 13 is then screwed home. Finally the capsule 12 is inserted around the capsule 13 and it is screwed home.

In the operation of my oil and gas separator it is attached to the oil pipe extending downward from the wellhead. Fluid will flow from the outside through the holes 22 into the space within the inner capsule composed of the halves 11 and 13. The gas contained in the fluid will pass off through the bore 26 and when there is enough oil in the capsule space 30 the float 15 will be lifted and the oil permitted to pass through cross bore 21 and bore 20 into the space 29 between the two capsules. It will continue upward through the holes 23 and upward into the pipe length 28 and on into the oil pipe and so to the wellhead. Should the amount of oil in the inner capsule space 30 diminish the float 15 will fall and the cross bore 21 will then be closed.

What I claim as new, and desire to secure by Letters Patent of the United States, is:

1. In an oil and gas separator an annular coupling, an upper and a lower inner capsule attached to said coupling on the inside, said lower inner capsule having a pipe rising from its bottom, an upper and a lower outside capsule attached to said coupling on the outside, said upper outside capsule communicating at its top with the oil pipe, said coupling provided with radial holes for the passage of fluid from the outside inward to a central space and vertical holes for the passage of oil upward in the annualr space between said outside and inside capsules, said upper inside capsule provided with a port leading outward through said upper outside capsule, and means to control the flow of oil through said pipe from said central space to said annular space.

2. In an oil and gas separator an annular coupling having threads on the inside and on the outside, an upper and a lower outer capsule threaded to said coupling on the outside, said upper outer capsule communicating at its top with the oil pipe, an upper and a lower inner capsule threaded to said coupling on the inside, said upper inner capsule provided with a port leading outward through said upper outer capsule, said coupling having radial holes for the passage of fluid from the outside inward and vertical holes for the passage of oil upward in the annular space between said outer and inner capsules, a pipe rising from the bottom of said lower inner capsule having an opening in its side, a collar slidable on said pipe to close said opening, and a float connected to said collar to lift same and open said opening.

3. In an oil and gas separator as set forth in claim 2 a head on the top of the pipe rising from the bottom of said lower inner capsule to limit the upward movement of the collar slidable on said pipe.

References Cited in the file of this patent

UNITED STATES PATENTS

| | | |
|---|---|---|
| 1,360,913 | Forest | Nov. 30, 1920 |
| 2,128,475 | Rodgers | Aug. 30, 1938 |
| 2,142,376 | Rodgers | Jan. 3, 1939 |
| 2,164,253 | Moore | June 27, 1939 |